United States Patent [19]

Penney

[11] Patent Number: 4,707,727
[45] Date of Patent: Nov. 17, 1987

[54] APPARATUS FOR PROVIDING AN INDICATION THAT A COLOR REPRESENTED BY A Y, R-Y, B-Y COLOR TELEVISION SIGNAL IS VALIDLY REPRODUCIBLE ON AN RGB COLOR DISPLAY DEVICE

[75] Inventor: Bruce J. Penney, Portland, Oreg.

[73] Assignee: Tektronix, Inc., Beaverton, Oreg.

[21] Appl. No.: 849,615

[22] Filed: Apr. 8, 1986

[51] Int. Cl.⁴ .................. H04N 17/02; H04N 9/67; G03F 3/08

[52] U.S. Cl. ........................... 358/10; 358/30; 358/80; 358/81

[58] Field of Search ............ 358/10, 30, 80, 81, 358/82

[56] References Cited

U.S. PATENT DOCUMENTS

| | | | |
|---|---|---|---|
| 4,058,828 | 11/1977 | Ladd | 358/80 |
| 4,189,742 | 2/1980 | Klopsch | 358/80 |
| 4,285,009 | 8/1981 | Klopsch | 358/80 |
| 4,488,171 | 12/1984 | Pugsley et al. | 358/80 |
| 4,500,919 | 2/1985 | Schreiber | 358/80 |

OTHER PUBLICATIONS

Baker, Dan, "New and Unique Method for Measuring Video Analogue Component Signal Parameters", publication and date unknown, pp. 98-109.

Primary Examiner—John W. Shepperd
Assistant Examiner—Randall S. Svihla
Attorney, Agent, or Firm—John Smith-Hill; Francis I. Gray

[57] ABSTRACT

Apparatus for providing an indication that a color represented by a color video signal having a luminance component Y and two color difference components R-Y, B-Y is validly reproducible on an RGB color display device. A resistive matrix converts the Y, R-Y, B-Y components of the color video signal to three primary color components R, G, B. Comparators compare the amplitude of each primary color component with predetermined minimum and maximum values, and an OR-gate produces a gamut error signal if the amplitude of one or more of the primary color components is outside the range established by the corresponding predetermined minimum and maximum values. The gamut error signal is applied to a display modifier which modifies the luminance and color difference components to produce a visually distinct effect on a waveform or display monitor. Alternatively, the gamut error signal may be applied to, for example, a color shutter incorporated in the waveform or display monitor to modify the color of the display.

6 Claims, 4 Drawing Figures

APPARATUS FOR PROVIDING AN INDICATION THAT A COLOR REPRESENTED BY A Y, R-Y, B-Y COLOR TELEVISION SIGNAL IS VALIDLY REPRODUCIBLE ON AN RGB COLOR DISPLAY DEVICE

This invention relates to an apparatus for providing an indication of color television signal validity.

BACKGROUND OF THE INVENTION

The term "color display device" is used herein to designate a device that comprises three primary color light sources which form separation images in the three additive primary colors (red, green and blue) respectively. In the case of a shadow-mask color CRT, the three light sources comprise the respective electron guns and the associated phosphor deposits. A color display device receives a video signal having three primary color components (R, G, and B), and is adjusted such that a minimum valid value of any one of the three components (R, G and B) drives the corresponding light source to a minimum, or perceived off, condition and a maximum valid value drives the light source to maximum brightness. Typically, the minimum valid value is zero volts and the maximum valid value is 0.7 volts; and these values may be represented as 0 and 1 respectively in arbitrary units. The primary color components R, G and B are generally derived from encoded luminance and color difference components (e.g. R-Y and B-Y) using a resistive matrix. The Y, R-Y and B-Y components in turn are derived from a composite video signal, such as a signal in accordance with the NTSC or PAL format, using well-known filtering and demodulating techniques. For many years, the only significant source of a video signal was a video camera, which generates the video signal in primary color component form, encodes the primary color components into luminance and color difference components, and then combines the latter components to produce the composite video signal. Also, for many years most processing of the video signal took place in the primary color component domain or in the composite (NTSC or PAL) domain and video signals were not processed in luminance and color difference component form.

Since the values of the R, G and B components are independent variables, the range, or gamut, of colors that can be faithfully reproduced using a conventional color display device can be represented in a three-dimensional rectangular Cartesian coordinate system, having R, G and B axes, by a cube, as shown in FIG. 1. The eight corners of the cube represent the three additive primary colors, the three additive secondary colors (magenta, yellow and cyan), black and white. The solid and dot-dashed lines between the corners of the cube represent the transitions between colors of a standard color bar signal. In order for a color to be reproducible using a color display device, the point defined by the three color components of the target color must lie within the cube defined by the solid and dashed lines.

The conventional vectorscope provides a two-dimensional display of the color difference components R-Y and B-Y. The vectorscope display is luminance independent, and may be thought of as representing a projection of the FIG. 1 cube into a plane that is perpendicular to the (1,1,1) vector. Therefore, the primary and secondary colors are represented by the corners of a regular hexagon and the center of the hexagon represents both black and white. In FIG. 2, the solid lines and the dot-dashed lines between corners of the hexagon represent transitions between colors of a standard color bar signal. Any validly reproducible color, i.e. any color that can be represented by a point inside the color cube of FIG. 1, can also be represented by a point inside the hexagon defined by the solid and dashed lines of FIG. 2, but the converse is not true: not every point inside the hexagon of FIG. 2 corresponds to a point inside the cube of FIG. 1.

It has recently become common to generate composite video signals otherwise than from the primary color components. Such sources, e.g. television graphics systems, may generate signals directly in the luminance and color difference domain. Moreover, it has become common to process signals in the luminance and color difference domain. In Baker, "New and Unique Method for Measuring Video Analogue Component Signal Parameters" presented at the 19th Annual Winter SMPTE Conference held at San Francisco in February, 1985 and published in SMPTE Journal, October 1985, 1009, there is a discussion of a display format that is similar in some ways to a conventional vectorscope display but is particularly suited to a signal in luminance and color difference component format. The display described by Baker is a composite display of Y vs. R-Y and −Y vs. B-Y on alternate lines. The points representing the colors corresponding to the corners of the FIG. 1 cube are distributed in a zig-zag pattern (FIG. 3) down the display. A given color, defined by a set of values for R, G and B, is represented in this composite display by two points, one in the Y, R-Y space and the other in the −Y, B-Y space. As in FIGS. 1 and 2, the solid and dot-dashed lines in FIG. 3 between the primary and secondary color points represent transitions between the colors of a standard color bar signal.

The composite display described by Baker is particularly useful in observing timing and amplitude errors among the three components. It has been suggested that if a set of luminance and color difference values defines two points of which one lies inside the boundary defined by the solid and dashed lines in Y, R-Y space and the other of which lies inside the boundary defined by the solid and dashed lines in −Y, B-Y space, then that set of values defines a validly reproducible color.

SUMMARY OF THE INVENTION

The above-mentioned suggestion has been found to be incorrect. It can be shown that there are some combinations of Y, R-Y and B-Y that define a point that lies inside the boundary defined by the primary and secondary color points in the Y, R-Y space of the display shown in FIG. 3 and a point that lies inside the boundary defined by the primary and secondary color points in the Y, B-Y space but nevertheless defines a point that is outside the R, G, B color cube and therefore does not represent a validly reproducible color. For example, assuming that $Y=0.299R+0.587G+0.114B$, if $Y=0.886$, $B-Y=+0.114$ and $R-Y=-0.267$, then $R=0.619$, $G=1$ and $B=1$. Therefore $R-Y=-0.267$ is a valid value for $Y=0.886$ within the Y, R-Y space. Similarly, for $Y=0.886$, $B-Y=-0.886$ and $R-Y=+0.114$, $R=1$, $G=1$ and $B=0$, and therefore the value of $-0.886$ is a valid value for B-Y in the −Y, B-Y space. However, if $Y=0.886$, $B-Y=-0.886$ and $R-Y=-0.267$, then $R=0.619$, $B=0$ and $G=1.194$. Consequently, the fact that the value of B-Y is a valid value within the −Y, B-Y space and that R-Y is a valid value within the Y, R-Y space is not sufficient to ensure that the color defined by Y, R-Y and B-Y is validly reproducible using a conventional color display device.

In accordance with the present invention there is provided apparatus for providing a signal that indicates whether the color represented by a luminance and color difference component video signal is validly reproducible using a color display device. In a preferred embodiment, the apparatus comprises a matrix connected to receive the luminance and color difference components and generate primary color components therefrom, and a comparator for comparing the amplitude of each primary color component with predetermined minimum and maximum levels and providing an indication if the amplitude of one or more of the primary color components is outside the range established by the predetermined maximum and minimum values therefor.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
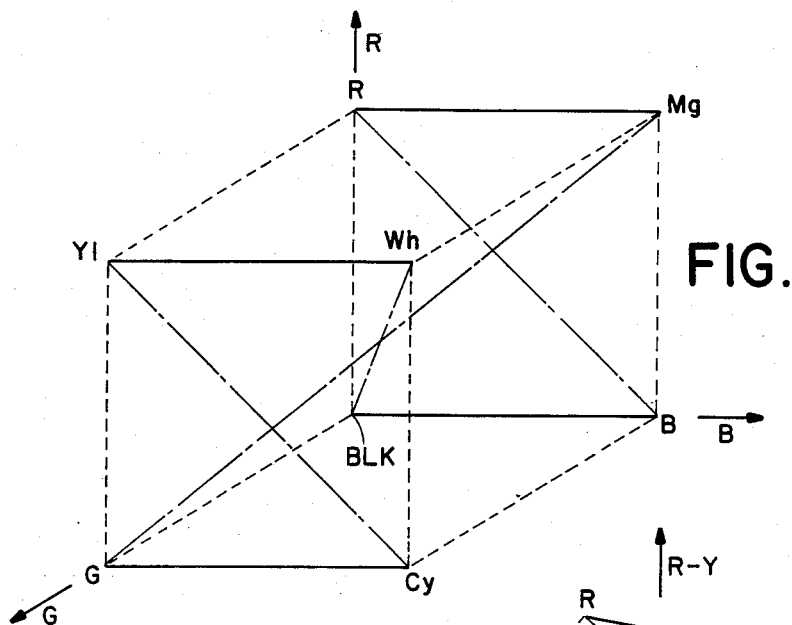
FIG. 1 illustrates the color gamut by reference to a three-dimensional Cartesian coordinate system.
Figure 2:
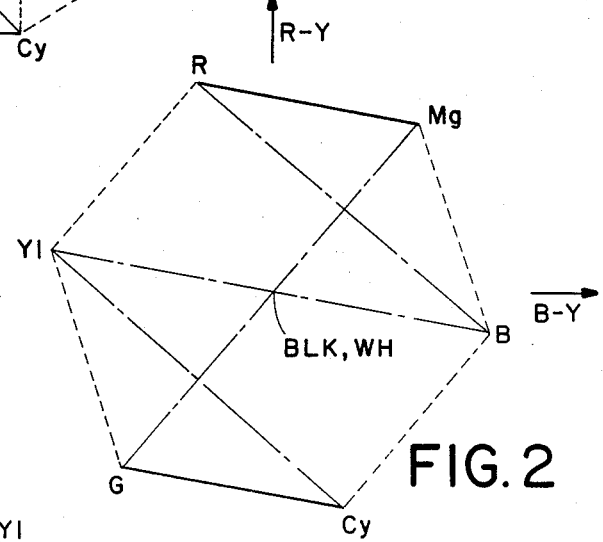
FIG. 2 illustrates a conventional vectorscope display of color bars.
Figure 3:
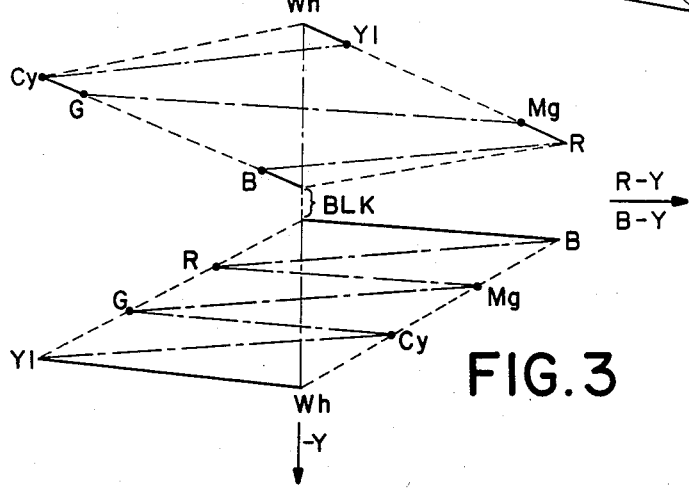
FIG. 3 illustrates a display of color bars using luminance and color difference as the coordinates.
Figure 4:
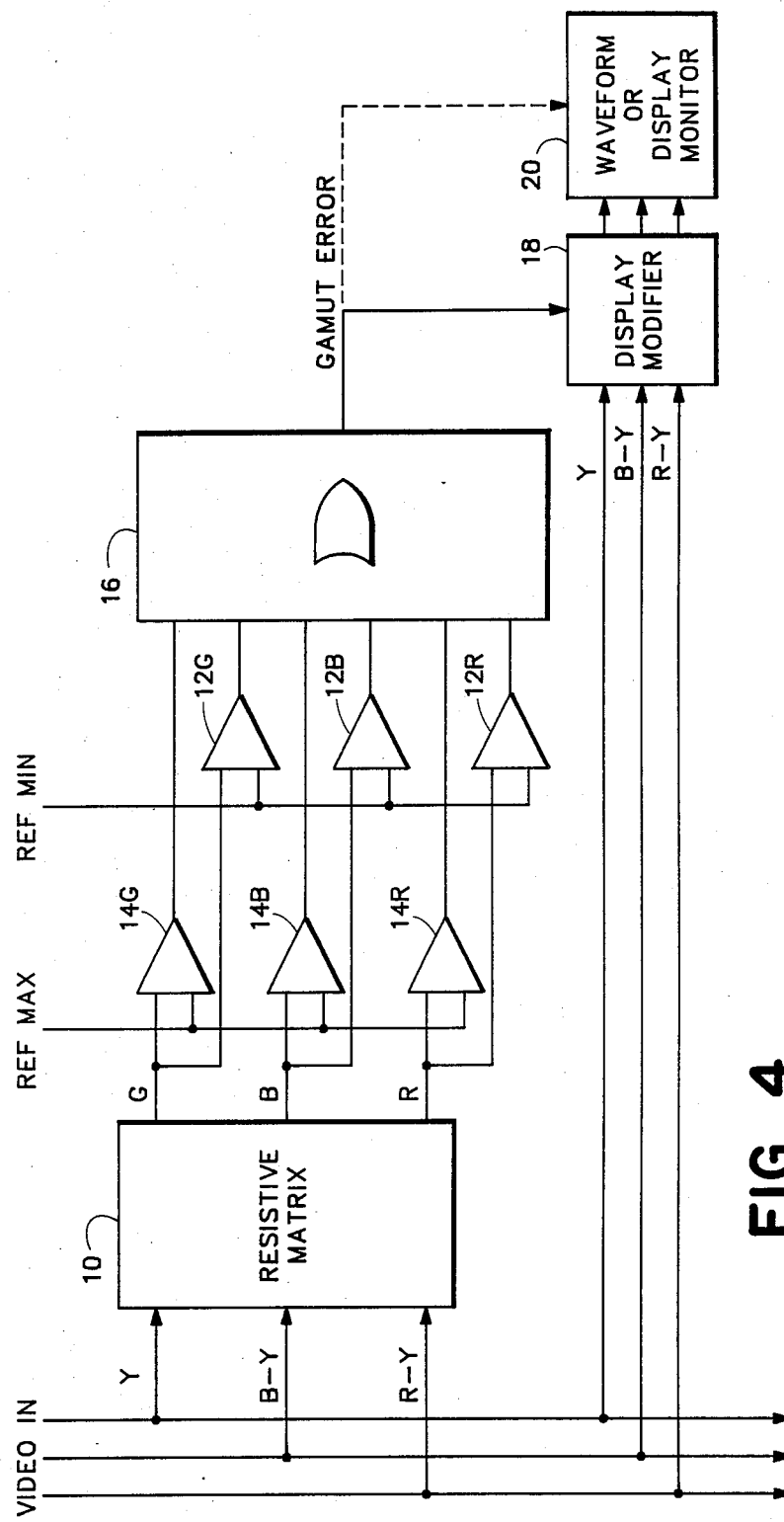
FIG. 4 is a block diagram of a device for indicating whether a video signal in luminance and color difference component form represents a validly reproducible color.

The apparatus shown in FIG. 4 comprises a conventional resistive matrix 10 that is connected to receive luminance and color difference components Y, R-Y and B-Y. The matrix provides the corresponding R, G, B components at its output, and each of these components is applied to two comparators 12 and 14. The comparator 12 receives as its reference signal a voltage REF MIN representing the value 0 and the comparator provides a logical 1 output if the signal from the matrix has a value less than the voltage of the reference signal. The comparator 14 receives as its reference signal a voltage REF MAX representing the value 1 and the comparator 14 provides a logical 1 at its output if the voltage of the signal provided by the matrix exceeds the voltage of the reference signal. The outputs of the comparators are applied to an OR gate 16, and the OR gate provides a gamut error signal at its output. The gamut error signal is applied to a display modifier 18 that is connected in the path of the Y, R-Y and B-Y components to a waveform or display monitor 20. The display modifier responds to a logical 1 provided by the OR gate 16 by modifying the luminance and color difference component signal to provide a visually distinct effect. For example, in the case of a display monitor, the display modifier may cause the display to blink, and in the case of a waveform monitor the display modifier may cause the display to be increased in brightness. Because the gamut error signal provided by the OR gate 16 is synchronous with the component video signal, the display modifier may only affect the area of the display for which the values R, G and B define a point that lies outside the color cube.

The display modifier need not act on the video signal that is applied to the monitor 20. For example, a color shutter may be incorporated in the monitor 20 and the gamut error signal applied directly to the monitor, as indicated by the dashed line in FIG. 4. The color shutter responds to the gamut error signal by modifying in a predetermined manner the image generated by the monitor. Color shutters that are at present commercially available are not capable of switching at frequencies much higher than the field frequency of a video signal (50 Hz or 60 Hz), and therefore if a color shutter is used as the display modifier the entire area of that display would be affected, e.g. by giving the display a characteristic color.

It will be appreciated that the present invention is not restricted to the particular apparatus that has been described and illustrated with reference to FIG. 4, and that variations may be made therein without departing from the scope of the invention. For example, the invention is not restricted to the color difference components being R-Y and B-Y, and any other pair of components that are orthogonally related in the vectorscope display, such as the I and Q components, may be used instead.

I claim:

1. Apparatus for providing a signal that indicates whether a color represented by a video signal having a luminance component and color difference components is validly reproducible on a color display device comprising:

first means connected to receive the luminance and color difference components to provide three primary color components therefrom, and comparison means for comparing the amplitude of each primary color component with predetermined minimum and maximum values and providing an indication if the amplitude of one or more of the primary color components is outside the range established by the corresponding predetermined minimum and maximum values.

2. Apparatus according to claim 1, wherein the first means comprises a resistive matrix.

3. Apparatus according to claim 1, wherein the comparison means comprises three pairs of comparators for respectively receiving the three primary color components, each pair of comparators consisting of a first comparator that provides a logical 1 output if but only if the amplitude of the associated primary color component is greater than the predetermined maximum value for that component and a second comparator that provides a logical 1 output if but only if the amplitude of the associated primary color component is less than the predetermined minimum value for that component.

4. Apparatus according to claim 3, further comprising an OR-gate connected to receive the outputs of the comparators and to provide a gamut error signal having a level representing logical 1 if but only if the output of any of the comparators is a logical 1.

5. Apparatus according to claim 4, further comprising display modifier means connected to receive the gamut error signal, the display modifier means being effective to cause a visually distinct indication to be provided when the gamut error signal has a value representing logical 1.

6. Apparatus according to claim 5, wherein the display modifier means is connected in the path of the video signal and is operative to modify the video signal in the event that the gamut error signal has a value representing logical 1, whereby a visually distinct indication is provided on a display device when the modified video signal is employed to drive the display device.

* * * * *